(12) United States Patent
Kang et al.

(10) Patent No.: US 7,675,453 B2
(45) Date of Patent: Mar. 9, 2010

(54) POWER SAVING APPARATUS

(75) Inventors: Hong Joo Kang, Yongin-si (KR); Won Woo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 11/491,926

(22) Filed: Jul. 25, 2006

(65) Prior Publication Data

US 2007/0159348 A1     Jul. 12, 2007

(30) Foreign Application Priority Data

Jan. 5, 2006     (JP)     ............ 10-2006-0001501

(51) Int. Cl.
*H04L 5/00*     (2006.01)

(52) U.S. Cl. ............ 341/176; 340/825.69; 345/168; 345/169

(58) Field of Classification Search ........ 341/176; 340/825.69; 345/168, 169; 307/140, 139, 307/135, 126

See application file for complete search history.

(56) References Cited

U.S. PATENT DOCUMENTS 4,728,949 A * 3/1988 Platte et al. ............ 340/825.37

2002/0097346 A1 * 7/2002 Chen ............ 348/836
2005/0093374 A1 * 5/2005 Connors et al. ............ 307/126

FOREIGN PATENT DOCUMENTS

KR     2002-0054596     7/2002

\* cited by examiner

*Primary Examiner*—Brian A Zimmerman
*Assistant Examiner*—Hung Q Dang
(74) *Attorney, Agent, or Firm*—Stanzione & Kim LLP

(57) ABSTRACT

A power saving apparatus that uses a plurality of switches, including a switch provided in a remote controller receptacle mounted on a device, to turn on or off power to a device according to whether a remote controller is received in the remote controller receptacle, thereby saving standby power of the device. The power saving apparatus includes first, second, and third switches, and a controller. The first switch is used to power on/off the device. The second switch is provided in the remote controller receptacle to turn on/off power to the device according to whether or not a remote controller is received in the remote controller receptacle. The controller outputs a control signal to turn on/off power to the device when power is supplied through the first or second switch. The third switch turns on or off the power to the device according to the control signal output from the controller.

16 Claims, 5 Drawing Sheets

POWER SAVING APPARATUS

CROSS-REFERENCE TO RELATED APPLICATIONS

This application claims the benefit of Korean Patent Application No. 2006-0001501, filed on Jan. 5, 2006 in the Korean Intellectual Property Office, the disclosure of which is incorporated herein by reference.

BACKGROUND OF THE INVENTION

1. Field of the Invention

The present general inventive concept relates to a power saving apparatus, and more particularly, to a power saving apparatus that uses a plurality of switches, including a switch provided in a remote controller receptacle mounted on a device, to turn on or off power to the device according to whether or not a remote controller is received in the remote controller receptacle, thereby saving standby power of the device.

2. Description of the Related Art

Electric appliances such as a TV and an air conditioner used at home are generally provided with a remote controller to allow users to remotely control the electric appliances, thereby improving user convenience. A remote control receiver in the electric appliance receives a control signal from the remote controller and transfers the control signal to a controller in the electric appliance. The controller identifies the control signal and controls the electric appliance to perform an operation corresponding to the control signal.

Generally, a minimum power (or standby power) is supplied to the controller including the remote control receiver in the electric appliance, which is controllable by the remote controller, when the electric appliance is inactive. The minimum power is supplied in order to allow the inactive electric appliance to receive the control signal output from the remote controller as the user operates the remote controller to control the electric appliance and then to perform the operation corresponding to the control signal.

The standby power, which is consumed when the electric appliance is inactive, is tens of watts per hour in a home according to statistics. Unnecessary power consumption due to the standby power throughout the country amounts to hundreds of millions of watts.

The electric appliance cannot be controlled using the remote controller if the power to the electric appliance is completely cut off and the standby power is kept at 0W in order to reduce the unnecessary waste of power. In this case, to control the electric appliance using the remote controller, the user must directly operate a power switch provided on the electric appliance to supply minimum power to the electric appliance.

A conventional power saving apparatus is disclosed in Korean Patent Application Publication No. 2002-54596. The conventional power saving apparatus includes a power controller, which determines whether or not a signal has been input to an infrared receiver, and a sub-power detector which turns on or off power to a microcomputer. This power saving apparatus also causes unnecessary power consumption since the minimum power must be supplied to allow the infrared receiver to determine whether or not a signal has been input to the infrared receiver. In addition, the additional sub-power detector increases manufacturing costs.

SUMMARY OF THE INVENTION

The present general inventive concept provides a power saving apparatus that efficiently reduces standby power to an electric appliance using a plurality of switches including a switch provided in a remote controller receptacle mounted on the electric appliance.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a power saving apparatus used with a device having a remote controller receptacle, the apparatus including a first switch that is used to power on/off the device, a second switch that is provided in the remote controller receptacle to turn on/off power to the device according to whether a remote controller is received in the remote controller receptacle, a controller that outputs a control signal to turn on/off power to the device when power is supplied through the first or second switch, and a third switch that turns on or off the power to the device according to the control signal output from the controller.

The first switch may be a tact switch externally provided on the device to supply power to the device including the controller when the switch is pressed by a user.

Even when no power is supplied through the first switch, power may still be supplied to the device including the controller through the third switch.

The third switch and the power switch may be connected in parallel on a line via which power is supplied to the device.

The third switch and the second switch may be connected in parallel on a line via which power is supplied to the device.

When the remote controller is received in the remote controller receptacle, the second switch turns off the power to the device including the controller.

The second switch may be a push button switch that turns off the power to the device when the switch is pressed by weight of the remote controller received in the remote controller receptacle.

When the power to the device is turned off by the second switch, power may still be supplied to the device including the controller through the third switch.

The third switch may be a relay switch that is controlled by the control signal output from the controller is a current to be applied to the third switch.

When a signal to deactivate the device is input after the power is supplied to the device including the controller, the third switch turns off the power to the device according to the control signal from the controller.

The foregoing and/or other aspects and utilities of the present general inventive concept may also be achieved by providing a power saving apparatus usable in a device having a remote control and a power on/off switch, the electric device including a remote control holder to receive the remote control, a controller to control the device, a remote control signal receiver to receive control signals from the remote control and to transmit the control signals to the controller, and a switching unit to place the device in a power off mode when the remote control is received in the remote control holder and either the power on/off switch is turned off or the remote control signal receiver transmits a turn off control signal to the controller.

The foregoing and/or other aspects and utilities of the present general inventive concept may also be achieved by providing a power saving apparatus usable in a device having a remote control and a remote control signal receiving unit to receive signals from the remote control, the power saving apparatus including a controller to control the device to turn on and off and to receive commands from the remote control signal receiving unit, a remote control holder to receive the remote control, and a switching unit to transfer electrical power to the controller, the device, and the remote control signal receiving unit, the switching unit having three switches arranged in parallel to cut off power to the controller and the remote control signal receiving unit when all three switches are turned off and to transfer power to the controller and the remote control signal receiving unit when any of the three switches are turned on.

The foregoing and/or other aspects and utilities of the present general inventive concept may also be achieved by providing a method of controlling power to a standby mode of a device having a remote control, the method including starting the standby mode by placing the remote control in a standby position and powering off the device, and ending the standby mode when the remote control is removed from the standby position.

The foregoing and/or other aspects and utilities of the present general inventive concept may also be achieved by providing a method of controlling a device having a remote control to shut down or power up a standby mode, the method including shutting down the standby mode by placing a remote control in a receptacle and commanding a controller to turn off the device, and powering up a standby mode by either one of removing the remote control from the receptacle or commanding the controller to turn on the device.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
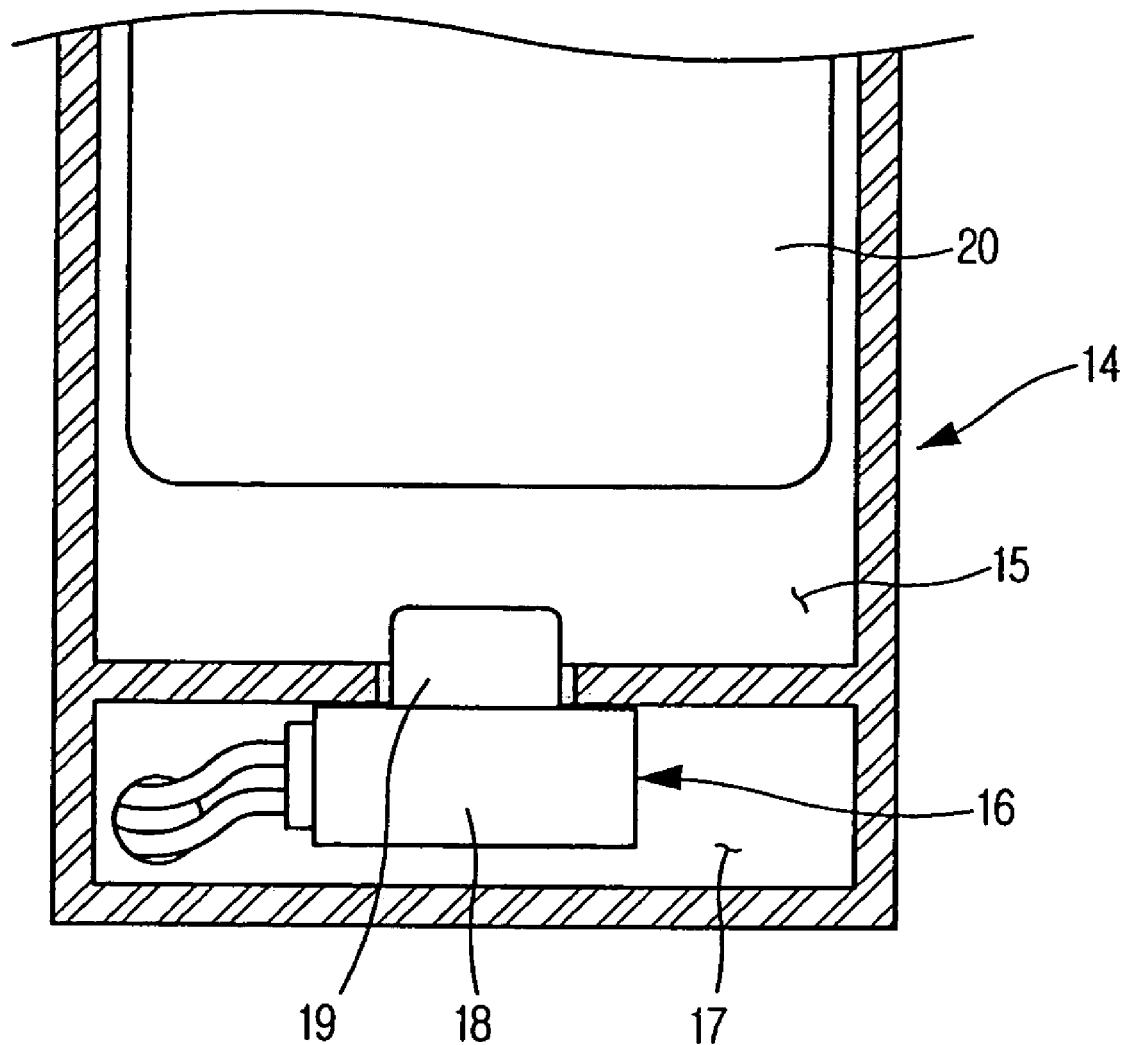
FIG. 1 is a detailed sectional view illustrating an embodiment of a remote controller receptacle including a switch according to the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a detailed sectional view illustrating a remote controller receptacle including a switch according to an embodiment of the present general inventive concept. Referring to FIG. 1, a receiving hole 15, in which a remote controller 20 is to be inserted, is defined in the remote controller receptacle 14. A mounting space 17 is defined in the remote controller receptacle 14 below the receiving hole 15 to mount therein a push button switch 16 that is turned on or off depending on whether the remote controller is received in the remote controller receptacle 14. The push button switch 16 is provided in the mounting space 17 such that it can be operated by the weight of the remote controller 20 inserted into the receiving hole 15.

The push button switch 16 is turned off when it is depressed by a depressing object (i.e., an object applying force thereto). Specifically, the push button switch 16 includes a switch body 18, which includes contacts, and a push button 19, a part of which protrudes into the receiving hole 15. Two electrical lines extending from an interior of an electrical appliance are connected to two contacts in the switch body 18 which are operated to turn on or off the power to the electrical appliance.

The push button switch 16 is normally on. That is, an "on" position may be an original position of the push button 19. When the push button 19 is pressed down by the received remote controller 20, the push button switch 16 is turned off as the contacts in the switch body 18 are separated by the pressed push button 19.

When the received remote controller 20 is removed from the remote control receptacle 14, the push button 19 depressed by the remote controller 20 returns to its original position by a resilient member (not illustrated) in the switch body 18, so that the separated contacts in the switch body 18 return to their original positions, thereby turning on the push button switch 16. That is, the push button switch 16 is turned off as the remote controller 20 is received in the remote control receptacle 14 and the push button switch 16 is turned on as the remote controller 20 is removed from the remote control receptacle 14.

Figure 2:
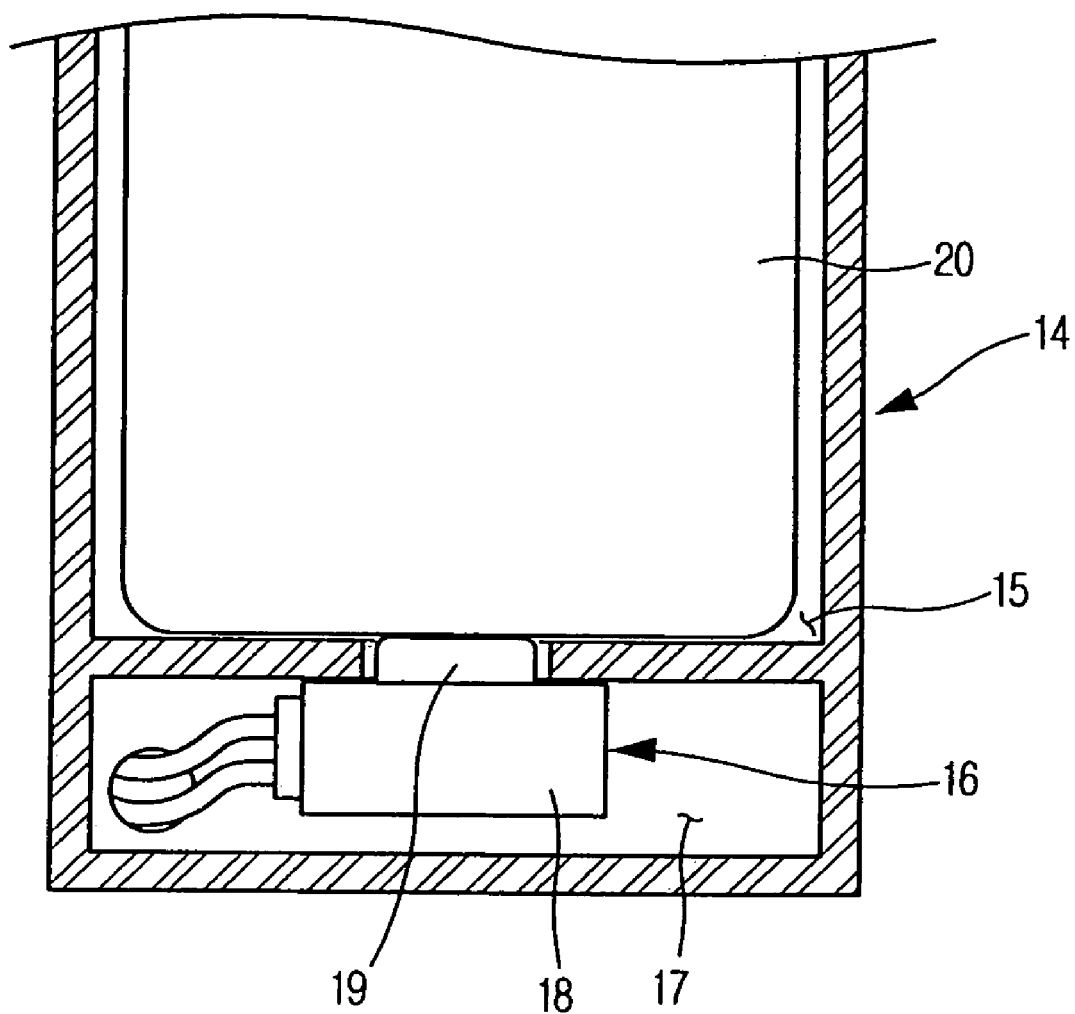
FIG. 2 is a detailed sectional view of the remote controller receptacle illustrating an operation of the switch of FIG. 1.

When the user desires to operate an electrical appliance such as an air conditioner using the remote controller 20, the user removes the received remote controller 20 from the remote controller receptacle 14 to operate the remote controller 20. When the electrical appliance is not used, the remote controller 20 can be received in the remote controller receptacle 14. FIG. 2 is a detailed sectional view of the remote controller receptacle illustrating an operation of the switch of FIG. 1. Referring to FIG. 2, the push button 19 of the push button switch 16 is pressed down by the weight of the received remote controller 20, and the contacts in the switch body 18 are separated by the pressed push button 19, so that the push button switch 16 is turned off. Standby power to the electrical appliance can be controlled by changing the state of the push button switch 16 in such a manner.

Figure 3:
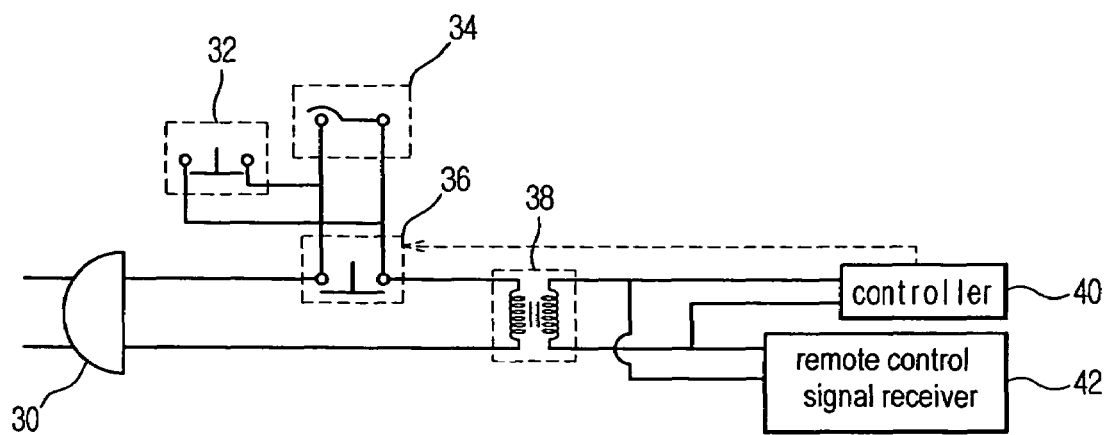
FIG. 3 is a schematic block diagram illustrating a power saving apparatus according to an embodiment of the present general inventive concept.

FIG. 3 is a schematic block diagram illustrating the power saving apparatus according to an embodiment of the present general inventive concept. Referring to FIG. 3, the power saving apparatus includes a first switch 34, a second switch 32, and a third switch 36. The first switch 34 is operated by the user and is externally provided on an electric appliance. The first switch 24 may also be a power switch 34 or a device operation switch 34 provided on the electric appliance. The second switch 32 is provided in the remote controller receptacle 14. The third switch 36 is connected in parallel with the first and second switches to turn on or off the power to the electric appliance. The power saving apparatus further includes a transformer 38, which reduces an applied AC voltage to an appropriate voltage, and a remote control signal receiver 42 and a controller 40 which are connected to a secondary of the transformer 38 and which are driven by power supplied to them.

Since the first switch 34, the second switch 32, and the third switch 36 are connected in parallel on a power line via which power from an AC power source 30 is supplied to the electric appliance, power is supplied to the electric appliance if at least one of the three switches 34, 32, and 36 is turned on.

The first switch 34 is a power switch that is generally provided on a case of the electric appliance. Various types of power switches may be used for the power switch. For example, a tact switch that turns on power only when it is depressed may be used.

The second switch 32 is installed in the remote controller receptacle 14 provided on the electric appliance. The second switch 32 is switched on or off depending on whether the remote controller 20 is received in the remote controller receptacle 14, thereby turning on or off the power to the electric appliance. As described above, the push button switch 16 that cuts off the power while it is depressed by a depressing object may be used.

When the first and second switches 34 and 32 are turned on so that power is supplied to the transformer 38, the controller 40 outputs a control signal to turn on the third switch 36. Turning on/off of the third switch 36 is controlled according to the control signal from the controller 40. The third switch 36 may be a relay switch that is turned on or off depending on whether a current is applied to the third switch 36. For example, when the controller 40 outputs the current to the relay switch 36 (i.e., the third switch), a magnetic force is applied to a coil (not illustrated) provided in the relay switch 36, thereby turning on the relay switch 36, whereas, when the controller 40 outputs no current to the relay switch 36, the coil returns to its original state, thereby turning off the relay switch 36.

The controller 40 may include a microcomputer and is provided in the electric appliance. When the power is supplied to the controller 40, the controller 40 outputs the current to the third switch 36, thereby turning on the third switch 36. When the first switch (power switch) 34 is turned off via the remote controller 20 or directly by the user, the controller 40 performs a preset termination procedure of the electric appliance and stops outputting the current to the third switch 36, thereby turning off the third switch 36. The controller 40 may also control the overall operation of the electric appliance.

The remote control signal receiver 42 receives a remote control signal transmitted from the remote controller 20 and transfers the remote control signal to the controller 40. When the remote controller 20 is received in the remote controller receptacle 14, the power saving apparatus according to an embodiment of the present general inventive concept cuts off the power to the remote control signal receiver 42, thereby avoiding unnecessary power consumption.

Figure 4:
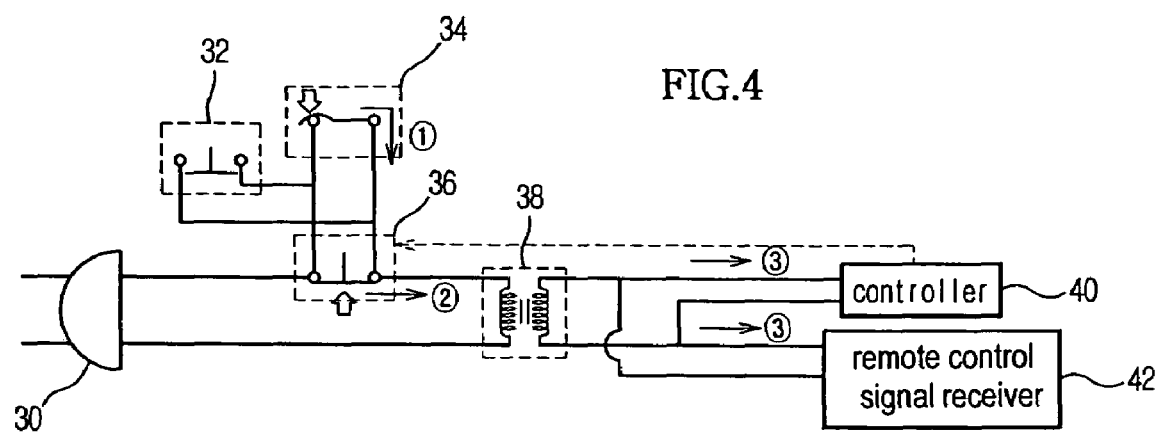
FIG. 4 is a schematic block diagram illustrating an operation according to the state of a power switch of the power saving apparatus of FIG. 3.
Figure 5:
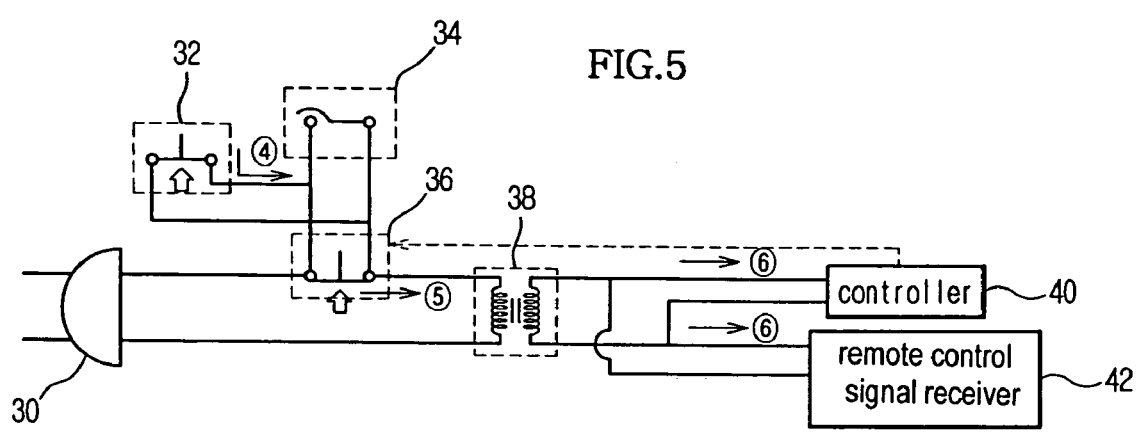
FIG. 5 is a schematic block diagram illustrating an operation of the power saving apparatus of FIG. 3 according to whether the remote controller is received in the remote controller receptacle.

FIGS. 4 and 5 are schematic block diagrams illustrating an operation of the power saving apparatus according to the state of the power switch (i.e., the first switch) 34 and according to whether the remote controller 20 is received in the remote controller receptacle 14. The operation of the power saving apparatus of the present general inventive concept will now be described with reference to FIGS. 4 and 5.

FIG. 4 illustrates a state of the power saving apparatus when the first switch (power switch) 34 is operated. When the user presses the first switch 34, power is supplied to the electric appliance including the controller 40 and the remote control signal receiver 42 during the time when the first switch 34 is pressed (①and ③). When the power is supplied to the electric appliance, the controller 40 outputs a current to the third switch 36, thereby turning on the third switch 36. When the user releases the first switch 34, no power is supplied through the first switch 34, but the power is still supplied to the electric appliance through the third switch 36 (② and ③). Thereafter, when the user again presses the first switch 34 to cut off the power, a signal according to this operation of the first switch 34 is transferred to the controller 40 and the controller 40 stops outputting the current to the third switch 36 to turn off the third switch 36, thereby cutting off the power to the electric appliance.

FIG. 5 illustrates a state of the power saving apparatus when the second switch 32 is operated according to whether the remote controller 20 is received in the remote controller receptacle 14. The second switch 32 can be the push button switch 16. As described above, when the remote controller 20 is received in the remote controller receptacle 14, the second switch 32 is turned off and, when the remote controller 20 is removed from the remote control receptacle 14, the second switch 32 is turned on. When the user removes the remote controller 20 from the remote controller receptacle 14 to use the remote controller 20, the second switch 32 is turned on, thereby supplying power to the electric appliance (④). When the power is supplied to the electric appliance, the power is also supplied to the controller 40 and the remote control signal receiver 42 (⑥). This allows the remote control signal receiver 42 to transfer the remote control signal transmitted from the remote controller 20 to the controller 40. For example, when the remote controller 20 transmits the remote control signal to power on the electric appliance, the remote control signal receiver 42 transfers the remote control signal to the controller 40. Upon receiving the remote control signal to power on the electric appliance from the remote control signal receiver 42, the controller 40 outputs a current to the third switch 36, thereby turning on the third switch 36. Even when the second switch 32 is turned off as the user stops using the remote controller 20 and inserts the remote controller 20 into the remote controller receptacle 14, the power is supplied to the electric appliance since the third switch 36 is on (⑤). Thereafter, when the user inputs a signal to power off the electric appliance via the first switch 34 or the remote control signal from the remote controller 20, the controller 40 turns off the third switch 36, thereby cutting off the power to the electric appliance as described above.

As described above, according to the present general inventive concept, the power to the electric appliance is cut off when the electric appliance is not in operation, thereby reducing unnecessary power consumption. Even when the electric appliance is powered off, in the state that the remote controller 20 is not in the remote controller receptacle 14, the power is supplied to the remote control signal receiver 42 through the second switch 32 in the remote controller receptacle 14, thereby allowing the user to use the remote controller 20 without operating the power switch on the electric appliance.

In the case when the first, second, and third switches 34, 32, and 36 are all turned off, the electric appliance may also be referred to as being in a power off mode where no power is consumed by the electric appliance, the remote control signal receiver 42, or the controller 40. When at least one of the first, second, and third switches 34, 32, and 36 is turned on, the device can be ready to be controlled by the remote controller 20.

As is apparent from the above description, the present general inventive concept provides a power saving apparatus. Standby power to an electric appliance is cut off through a simple circuit, which includes a plurality of switches including a switch provided in a remote controller receptacle mounted on the electric appliance, thereby reducing unnecessary power consumption.

In addition, the power consumption apparatus is constructed using inexpensive, common switches, thereby reducing manufacturing costs.

In addition, since the power consumption apparatus includes switches, the power consumption apparatus avoids malfunction due to noise and has a high durability and a high shock resistance.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A power saving apparatus used with a device having a remote controller receptacle, the apparatus comprising:
   a first switch to power on/off the device;
   a second switch provided in the remote controller receptacle to turn on/off power to the device according to whether a remote controller is received in the remote controller receptacle;
   a controller that outputs a control signal to turn on/off power to the device when power is supplied through the first or second switch; and
   a third switch that turns on or off the power to the device according to the control signal output from the controller.

2. The power saving apparatus according to claim 1, wherein the first switch is a tact switch externally provided on the device to supply power to the device including the controller when the switch is pressed by a user.

3. The power saving apparatus according to claim 1, wherein, even when no power is supplied through the first switch, power is still supplied to the device including the controller through the third switch.

4. The power saving apparatus according to claim 1, wherein the third switch and the first switch are connected in parallel on a line via which power is supplied to the device.

5. The power saving apparatus according to claim 4, wherein the third switch and the second switch are connected in parallel on a line through which power is supplied to the device.

6. The power saving apparatus according to claim 1, wherein, when the remote controller is received in the remote controller receptacle, the second switch turns off the power to the device including the controller.

7. The power saving apparatus according to claim 6, wherein the second switch comprises a push button switch that turns off the power to the device when the switch is pressed by weight of the remote controller received in the remote controller receptacle.

8. The power saving apparatus according to claim 6, wherein even when the power to the device is turned off by the second switch, power is still supplied to the device including the controller through the third switch.

9. The power saving apparatus according to claim 1, wherein the third switch is a relay switch that is controlled by the control signal output from the controller.

10. The power saving apparatus according to claim 9, wherein the control signal is a current applied to the relay switch.

11. The power saving apparatus according to claim 1, wherein, when a signal to deactivate the device is input after the power is supplied to the device including the controller, the third switch turns off the power to the device according to the control signal from the controller.

12. A device having a remote control and a power on/off switch, the device comprising:
   a remote control holder to receive the remote control;
   a controller to control the device;
   a remote control signal receiver to receive control signals from the remote control and to transmit the control signals to the controller; and
   a switching unit disposed in the remote control holder to place the device in a power off mode when the remote control is received in the remote control holder,
   wherein the power on/off switch is externally on the device.

13. The device of claim 12, wherein the switching unit removes the device from the power off mode when either the remote control is not received in the remote control holder or the power on/off switch is turned on.

14. The device of claim 12, wherein in the power off mode, the remote control signal receiver, and the controller receive no electricity.

15. A power saving apparatus usable in a device having a remote control and a remote control signal receiving unit to receive signals from the remote control, the power saving apparatus comprising:
   a controller to control the device to turn on and off and to receive commands from the remote control signal receiving unit;
   a remote control holder to receive the remote control; and
   a switching unit to transfer electrical power to the controller and the remote control signal receiving unit, the switching unit having three switches arranged in parallel to cut off power to the controller, the device, and the remote control signal receiving unit when all three switches are turned off and to transfer power to the controller and the remote control signal receiving unit when any of the three switches are turned on.

16. The power saving apparatus of claim 15, wherein the three switches comprise a first switch provided on the device to turn the device on or off, a second switch provided in the remote control holder to turn on when the remote control is not received in the remote control holder and to turn off when the remote control is received therein, and a third switch controlled by the controller, and the controller turns on the third switch when the first switch or the second switch is turned on and the controller turns off the third switch when the first switch is turned off or when the remote control signal receiving unit receives a turn off command from the remote control.

* * * * *